US012750544B2

(12) United States Patent
Major

(10) Patent No.: US 12,750,544 B2
(45) Date of Patent: Sep. 29, 2026

(54) AUTOMATED DIGITAL ADVERTISEMENT REPLACEMENT

(71) Applicant: Sling TV L.L.C., Englewood, CO (US)

(72) Inventor: Robert Drew Major, Orem, UT (US)

(73) Assignee: Sling TV L.L.C., Englewood, CO (US)

(*) Notice: Subject to any disclaimer, the term of this patent is extended or adjusted under 35 U.S.C. 154(b) by 55 days.

(21) Appl. No.: 18/935,307

(22) Filed: Nov. 1, 2024

(65) Prior Publication Data

US 2025/0063218 A1 Feb. 20, 2025

Related U.S. Application Data

(63) Continuation-in-part of application No. 18/473,141, filed on Sep. 22, 2023, now Pat. No. 12,200,284, which is a continuation of application No. 16/732,277, filed on Dec. 31, 2019, now Pat. No. 11,778,257, which is a continuation-in-part of application No. 16/514,865, filed on Jul. 17, 2019, now Pat. No. 11,564,002, which is a continuation-in-part of application No. 15/856,405, filed on Dec. 28, 2017, now Pat. No. 10,412,446, which is a continuation-in-part of application No. 15/600,334, filed on May 19, 2017, now abandoned, said application No. 16/514,865 is a continuation-in-part of application No. 15/393,548, filed on Dec. 29, 2016, now Pat. No. 11,463,785, said (Continued)

(51) Int. Cl.

*H04N 21/262* (2011.01)
*G06Q 30/0272* (2023.01)
*H04H 60/37* (2008.01)
*H04N 21/234* (2011.01)

(52) U.S. Cl.

CPC ... *H04N 21/26241* (2013.01); *G06Q 30/0272* (2013.01); *H04H 60/372* (2013.01); *H04H 60/375* (2013.01); *H04N 21/23424* (2013.01)

(58) Field of Classification Search

CPC ....... H04N 21/26241; H04N 21/23424; H04H 60/372; H04H 60/375; G06Q 30/0272

See application file for complete search history.

(56) References Cited

U.S. PATENT DOCUMENTS

2007/0136742 A1* 6/2007 Sparrell ................ H04N 21/84 348/E5.007
2009/0204640 A1* 8/2009 Christensen ....... G06Q 30/0267

(Continued)

*Primary Examiner* — Randy A Flynn

(74) *Attorney, Agent, or Firm* — KW Law, LLP

(57) ABSTRACT

Systems, devices, and automated processes are described to automatically replace digital advertisements, for example swapping wasted ad slots in a media program. Systems and automated processes may provide identifiers describing advertisements to a playback device, receive an identifier from the playback device indicating an encountered advertisement, determine saturation of the playback device based on the received identifier, replace the identified advertisement. Replacing the identified advertisement may include identifying an advertiser corresponding to the identified advertisement, identifying a different advertiser and a replacement advertisement corresponding to the different advertiser, and transmitting an identifier for the replacement advertisement to the playback device.

20 Claims, 6 Drawing Sheets

Related U.S. Application Data application No. 15/600,334 is a continuation of application No. 14/216,235, filed on Mar. 17, 2014, now Pat. No. 9,661,380, said application No. 15/393,548 is a continuation-in-part of application No. 13/836,688, filed on Mar. 15, 2013, now Pat. No. 10,212,490.

(60) Provisional application No. 63/596,101, filed on Nov. 3, 2023, provisional application No. 62/787,169, filed on Dec. 31, 2018, provisional application No. 62/699,473, filed on Jul. 17, 2018, provisional application No. 62/440,013, filed on Dec. 29, 2016, provisional application No. 62/274,106, filed on Dec. 31, 2015, provisional application No. 61/800,847, filed on Mar. 15, 2013.

(56) References Cited

U.S. PATENT DOCUMENTS

| | | | | |
|---|---|---|---|---|
| 2011/0142417 | A1* | 6/2011 | Wilson | H04N 21/4147<br>386/250 |
| 2011/0314495 | A1* | 12/2011 | Zenor | H04N 21/2668<br>725/34 |

* cited by examiner

AUTOMATED DIGITAL ADVERTISEMENT REPLACEMENT

PRIORITY CLAIM

This application claims benefit of U.S. Provisional Patent Application Ser. No. 63/596,101 filed on Nov. 3, 2023, and is a continuation-in-part of U.S. patent application Ser. No. 18/473,141 filed on Sep. 22, 2023. That application is a continuation of U.S. patent application Ser. No. 16/732,277 filed on Dec. 31, 2019 (now U.S. Pat. No. 11,778,257), which claims priority to U.S. Provisional Patent Application Ser. No. 62/787,169 filed on Dec. 31, 2018 and is a continuation-in-part of U.S. patent application Ser. No. 16/514,865 filed on Jul. 17, 2019 (now U.S. Pat. No. 11,564,002). That application claims benefit of U.S. Provisional Application Ser. No. 62/699,473 filed on Jul. 17, 2018 and is a continuation-in-part of U.S. patent application Ser. No. 15/393,548 filed on Dec. 29, 2016 (now U.S. Pat. No. 11,463,785), which claims benefit of U.S. Provisional Application Ser. No. 62/274,106 filed on Dec. 31, 2015 and is a continuation-in-part of U.S. application Ser. No. 13/836,688 filed on Mar. 15, 2013 (now U.S. Pat. No. 10,212,490). U.S. patent application Ser. No. 16/514,865 filed on Jul. 17, 2019 is also a continuation-in-part of U.S. application Ser. No. 15/856,405 filed on Dec. 28, 2017 (now U.S. Pat. No. 10,412,446), which claims benefit of U.S. Provisional Application Ser. No. 62/440,013 filed on Dec. 29, 2016 and is a continuation-in-part of U.S. application Ser. No. 15/600,334 filed May 19, 2017, which is a continuation of U.S. application Ser. No. 14/216,235 filed on Mar. 17, 2014 (now U.S. Pat. No. 9,661,380), which claims benefit of U.S. Provisional Application Ser. No. 61/800,847 filed on Mar. 15, 2013. All of these applications are incorporated herein by reference.

TECHNICAL FIELD

The present disclosure generally relates to automatically replacing portions of digital media content, such as broadcast television content. More particularly, the following discussion relates to automatically replacing certain advertisements or other portions of digital media content.

BACKGROUND

Advertisers are facing increasing challenges in providing advertising content that is engaging and relevant to a wide number of viewers. While advertisers often attempt to improve the reach and frequency of their advertisements, in practice this can be extraordinarily difficult, particularly as digital video recorders (DVRs) and similar technologies make ad skipping easier than ever.

At the same time, most television viewers will agree that it is commonplace to watch the same advertisement over and over during a broadcast. Even as television delivery and viewing equipment becomes increasingly sophisticated, the viewing experience can be significantly impacted through oversaturation of certain ads that provide little value to the advertiser while potentially annoying the viewer with unnecessary repetition.

Although various attempts have been made to deliver relevant ads using advanced technology, the distributed nature of broadcast television makes effective ad replacement difficult to implement. A typical broadcaster or other content distributor source often has many thousands or even millions of subscribers, each receiving their own copies of the broadcast content on their own receiving equipment. Modern television viewers frequently time and/or place shift their viewing using a local or remote storage DVR, thereby leading to thousands (or millions) of separate and distributed copies of the same content, each stored in a different location, and potentially recorded with slightly different parameters (e.g., start and end times). Further, many viewers receive slightly different broadcasts of the same content (e.g., different regional broadcasts), thereby leading to content variations even amongst customers of the same content distributor. These variations amongst the many different copies can make content enhancements (such as ad replacement) extraordinarily difficult to implement using current technologies.

It is therefore desirable to create systems, devices and automated processes to reliably maintain relevant digital advertisements for the viewer in broadcast television content as well as other media programming. These and other desirable features and characteristics will become apparent from the subsequent detailed description and the appended claims, taken in conjunction with the accompanying drawings and this background section.

BRIEF DESCRIPTION OF THE DRAWING FIGURES

Example embodiments will hereinafter be described in conjunction with the following drawing figures, wherein like numerals denote like elements, and FIG. 1 is a block diagram showing one example of a system for gathering and processing information about broadcast media content using automated content analysis;

BRIEF SUMMARY

Figure 1:
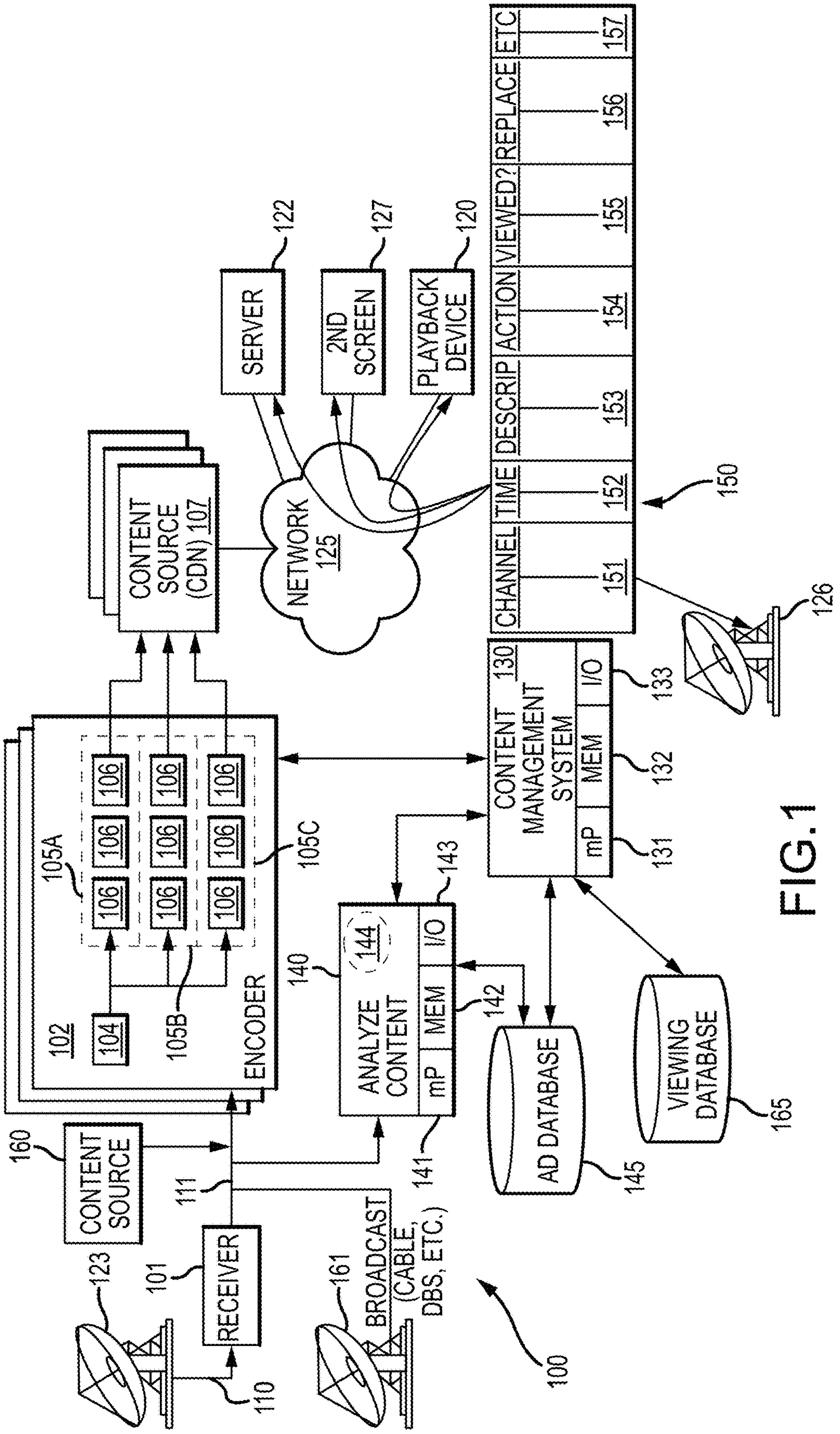

Various embodiments relate to systems, devices, and automated processes to automatically replace ads in media programs.

In various embodiment, an automated process performed by a computer system having a processor, a data storage, and an interface to a network is provided, the automated process comprising: providing, by the computer system via the network, to a playback device, a plurality of identifiers describing a plurality of identified advertisements in a plurality of media programs; receiving, by the computer system via the network interface, a first identifier of the plurality of identifiers corresponding to a first identified advertisement encountered by the playback device; determining, by the processor, a saturation of the playback device comprising determining that the first identified advertisement has been played by the playback device at least a threshold value; and replacing, by the processor and based upon the determined saturation, the first identified advertisement, comprising: identifying a first advertiser corresponding to the first identified advertisement; identifying a second advertiser corresponding to a second identified advertisement that is saturated on a second playback device; and transmitting, to the playback device via the network, a second identifier corresponding to the second identified advertisement to thereby direct the playback device to obtain the second identified advertisement and to present the second identified advertisement instead of the first identified advertisement.

Still other embodiments provide an automated process performed by a playback device having a processor, a data storage, and an interface to a network, the automated process comprising: receiving, by the playback device via the network, a plurality of identifiers describing a plurality of identified advertisements; recognizing, by the processor, a first identified advertisement of the plurality of identified advertisements in a received first media program, wherein a data associated with the first media program comprises a first identifier corresponding to the first identified advertisement; providing, by the playback device via the network, the first identifier to a content management system; receiving, from the content management system and in response to the content management system determining that the first identified advertisement has been played by the playback device at least a threshold value, a second identifier corresponding to a second identified advertisement, wherein the second identified advertisement is associated with a different advertiser than the first identified advertisement; obtaining, by the playback device via the network, the second identified advertisement according to the second identifier; and presenting the second identified advertisement instead of the first identified advertisement during playback of the first media program.

Still other embodiments provide a computer system having a processor, a memory, and an interface to a network, wherein the processor is configured to execute machine-readable instructions that are stored in the memory and that, when executed, carry out an automated process comprising: providing, by the computer system via the network, to a playback device, a plurality of identifiers describing a plurality of identified advertisements in a plurality of media programs; receiving, by the computer system via the network interface, a first identifier of the plurality of identifiers corresponding to the first identified advertisement in response to the playback device encountering the first advertisement in a first media program of the plurality of media programs; determining, by the processor, a saturation of the playback device comprising determining that the first identified advertisement has been played by the playback device at least a threshold value; and replacing, by the processor and based upon the determined saturation, the first identified advertisement, comprising: identifying a first advertiser corresponding to the first identified advertisement; identifying a second advertiser corresponding to a second identified advertisement that is saturated on a second playback device; and transmitting, to the playback device via the network, a second identifier corresponding to the second identified advertisement to thereby direct the playback device to obtain the second identified advertisement and to present the second identified advertisement during playback of the first media program instead of the first identified advertisement.

Other embodiments relate to other computing systems, automated processes, devices, and the like. These and other examples are described in increasing detail below.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

In various embodiments, data processing systems and automated processing are used to automatically improve the effectiveness of advertisements broadcast within television programming. Various embodiments can modify the ads that are presented so that the ad watched by the viewer is more timely and relevant, and so that the reach and saturation of advertisements can be improved. In particular, the various embodiments described below can be used to monitor ad viewing across a large number of playback devices for a large number of viewers, and to replace over-saturated ads that particular viewers have already watched with more relevant ads, thereby making the television experience more engaging for the viewer, and more effective for the advertiser. Various embodiments are able to perform ad replacement even when the program is being viewed at a later date (e.g., playback from a DVR) and/or when the program is place shifted to a different viewing location.

Certain ads can be automatically recognized and tagged for subsequent processing. As a playback device encounters a tagged advertisement, it may initially report that the ad has been viewed, if desired, and this viewing by that subscriber can be recorded in a database. If the same ad is subsequently encountered by the same viewer, the repeat viewing can be readily identified so that the previously-viewed ad can be replaced with another ad that is more engaging and/or more relevant to that particular viewer. Tracking and replacement can be performed even if the viewer is time or place shifting the viewing of the ad. Indeed, outdated ads in time shifted content (e.g., for events that occurred after the broadcast, but before the time shifted viewing) can be replaced with more relevant advertising. Ad tracking and replacement can therefore be used to greatly expand the reach and/or frequency of ad viewing across a wide number of viewers who each maintain their own separate copy of the broadcast programming.

Ad replacement can be of particular value when the new ad replaces an ad that is outdated (e.g., is intended for a different geographic area, or refers to a sale or event that has already occurred by the time the viewer watches a time-shifted program).

Further, the ability to reliably track viewing of ads and to automatically replace ads in stored content after the content has been broadcast provides substantial value. If a viewer has already seen a particular advertisement one or more times, for example, that ad can be replaced with a fresh ad that the viewer has not yet seen, thereby greatly boosting the reach and effectiveness of the advertisement. Advertisements can be targeted specifically at viewers that have not yet seen the ad, regardless of the channel or program that the ad was initially broadcast on, and with regard to other ads that the viewer may or may not have seen. This greatly increases ad saturation, and avoids the point of diminishing returns (PODR) that an ad can have when the same ad is repeatedly viewed by the same viewers of the same programs. The incremental cost of additional ad reach can therefore be substantially reduced, because additional ad buys can be targeted specifically at consumers who have not yet seen the ad. Put another way, ad reach can be increased without the need for substantially more ad saturation through the use of targeted advertising and ad replacement.

Reach of a particular ad can be improved by "pushing" the ad specifically toward viewers who have not yet seen the ad. By tracking viewership of a particular ad across channels and programs and playback devices, those viewers who have not yet viewed that particular ad can be identified and targeted with great accuracy, thereby allowing for greatly increased ad reach. That is, rather than saturating a large number of viewers who have already seen a particular ad in order to reach a small number of viewers who have not seen it, the fewer non-viewers can be specifically targeted without over-saturating the rest of the viewership with the same ad. Automated tracking and targeting of ad viewing can therefore allow a shift in focus from broad exposure to more focused, targeted exposure.

Automated tracking of ad viewing may support swapping of wasted ad slots. For example, an ad that is saturated for one particular player device and/or user may be replaced by an ad that is saturated for another particular player device and/or user. In some cases, the replacement may be two-way, such that the saturated ads are exchanged and each may play for a player device and/or user for which they are not saturated. Further, the replacement may require that the replacement ad is by a different advertiser, thus increasing exposure of a particular player device or user to additional advertisers. Swapping wasted ad slots can therefore result in fewer wasted ad slots that can't be filled by, e.g., a broadcaster, content delivery network, or the like, while simultaneously increasing reach and/or saturation of each ad and advertiser while avoiding oversaturation.

The following discussion refers to a database of broadcast advertisements. Recognition of ads in broadcast content and creation of an advertisement database may be performed in any manner. According to some implementations, audio fingerprinting or other content analysis techniques are used to identify the specific contents of a television broadcast. Content analysis can effectively and quickly identify advertisements or other portions of the broadcast stream. Moreover, the identification can be performed while the content is being broadcast or just before the content is re-distributed to the end viewer, thereby allowing identification of the actually-broadcast content at a time when such information can still be used to enhance the viewer experience. This "just prior" identification by a content aggregator can be more reliable and more flexible than prior techniques that relied upon programming schedules or metadata in the program stream.

Rapid identification of advertisements during broadcast further allows any number of beneficial actions to be made based upon the program content. Advertisements or other content can be identified in real time (or very near real time, accounting for some delays inherent in data processing, transmission, etc.) as the content is broadcast, if desired. The identification can recognize the same ads even when they are run on different channels, networks, programs and/or television markets, thereby providing a very comprehensive and useful database of information. This database could be used, for example, to track some or all of the ads run across a national (or even international) advertising campaign that spans multiple channels, programs and television markets. Similar constructs could be used to automatically and simultaneously track local ads run in one or more markets. The resulting database could therefore present an accurate and timely listing of a large number of ads for any number of different advertisers that are run across a variety of channels, programs and networks across a large number of television markets. This database, in turn, can be used to perform subsequent actions with regard to particular ads, including refreshment of outdated ads, replacement of the ad with a more relevant ad, and/or any other features as desired.

In various embodiments, additional information may be distributed to viewers in real time or otherwise to supplement the viewing of a live or recorded broadcast, as desired. Certain advertisements could be supplemented, for example, with links to purchase sites or to additional information about the product being advertised. Other embodiments could enable second screen applications (e.g., games or other features played on a smartphone, tablet, remote control or other device) related to the content that the viewer is watching. Still other embodiments could use the information obtained from the audio fingerprinting to skip over the ads in a broadcast, to prevent skipping over the ads (e.g., by disabling trick play while the ads are being broadcast), to replace the ads with other content, or to perform any other actions as desired. Even further, the information obtained from the content analysis may be stored with electronic program guide (EPG) or other content management data that can be shared with other services that process the received content, such as placeshifting, time shifting or the like. Moreover, identified content can be used to track time and/or placeshifted playback, and/or to replace ads as appropriate for time and/or placeshifted playback. These and other examples are described more fully below.

Turning now to the drawing figures and with initial reference to FIG. 1, an example data processing system 100 is shown that can identify and augment the contents of a broadcast television stream 110. The particular system 100 may be modified or enhanced in any manner. As illustrated in FIG. 1, however, system 100 suitably includes a receiver 101, a content identification system 140 that maintains a content database 145 and a content management system 130. Each of these components may be provided by a content aggregator or distributor such as a cable television system operator, a direct broadcast satellite (DBS) system operator, a streaming media provider, or simply a network service provider or the like. Other embodiments could provide the features described herein using conventional computing machinery (e.g., physical or cloud based servers) by parties that may or may not be interested in re-distributing the received content, as desired.

In various embodiments, television signals 110 for one or more networks, channels or the like are received in any format by the system operator via satellite 123, fiber optic or any other conventional wireless or physical media for transmitting television signals. The signals are received, demodulated and decoded as needed by any appropriate receiver(s) 101 to extract program signals 111 that represent the decoded television program stream. Alternately or additionally, content may be received directly from a broadcaster, distributor or other source 160, as desired.

The extracted programming signals 111 are analyzed as appropriate to identify the program contents. In the embodiment of FIG. 1, audio portions of the extracted signals are analyzed by an audio analysis system 140. Audio analysis system 140 is any computer system that is capable of analyzing audio contents from the decoded signals 111 to recognize advertisements or other portions of the underlying content. To that end, analysis system 140 typically includes any conventional processor 141, memory 142 and input/output interfaces 143 that would be commonly found on a server or similar computer system to access networks, mass storage and/or the like. Analysis system 140 could be equivalently implemented using cloud-based computing resources, as desired.

In most embodiments, the analysis system 140 executes a software application 144 that performs the analysis based upon the audio and/or video content received. In various embodiments, analysis considers average zero crossing rate, average spectrum, spectral flatness, prominent tones across a set of frequency bands, bandwidth and/or any other characteristics of the audio or video signal. Other embodiments could equivalently perform a temporal analysis in addition to or in place of frequency analysis. Such a temporal analysis could, for example, identify peak (or peak RMS) values in the time domain signal to find beats (e.g., in music) or other times between peak values that can uniquely identify the content. This temporal analysis could be combined into a fingerprint or signature in any way, or could be considered separately from other factors. Various examples of automatic content analysis software based upon audio and/or video data processing techniques are commercially available from Audible Magic Corporation, the Caipy corporation, and/or any number of other sources. Many different audio and video fingerprinting or other automated analysis programs could be used in any number of other embodiments.

The extracted content data may be compared to data previously stored in a database 145, as appropriate, to identify portions of content in the program stream. Commercials, for example, can be recognized when the audio portions of the program stream 111 contain similar data to known audio data stored in database 145. Database 145 may make use of conventional database software (e.g., database products available from Microsoft, IBM, Oracle, MySQL, SAP and/or any other vendor), or the database 145 may be a custom database developed to store content recognition data, as desired. Database 145 may reside on the same computing hardware as system 140, or separate computing resources could be provided, including any sort of cloud-based computing resources.

Typically, analysis application 144 initially recognizes scene changes in the underlying content. When a different scene is identified in the analyzed media stream, application 144 attempts to recognize the scene based upon digital analysis of the audio and/or video. If the scene already exists in database 145, then a new occurrence of the recognized scene can be recorded in database 145 or elsewhere. If the scene is not recognized, then a new entry in database 145 may be created to identify subsequent occurrences of the same scene. To that end, a digital "signature" or "fingerprint" of the scene is stored for subsequent analysis. Content may be initially recognized based upon information supplied by human data entry (e.g., crowdsourced data, or data entered by a technician), or by data supplied by a content source (e.g., an advertiser, broadcaster or network), and/or from any other source as desired. Content processing system 140 is therefore able to identify advertisements or other contents of the received television broadcast 111 through analysis of the underlying audio or video content.

In many implementations, content identification is performed in parallel for multiple channels that may be simultaneously received for content aggregation, for collection of advertising data, or for any other purpose. A distributor/aggregator, for example, may encode the extracted signals 111 for distribution on a digital network, for aggregation and redistribution of signals 111 over a DBS or cable distribution system 161, for generating content stored on a remote storage digital video recorder (RSDVR) or video on demand (VOD) service, or for any other purpose. Content identification could be performed while the content is being processed for redistribution. Alternately, content could be stored for subsequent analysis, as desired.

In the example of FIG. 1, content analysis occurs in parallel with the encoding of the live broadcast signals 111 for adaptive streaming on a digital network 125. To that end, FIG. 1 shows an encoder 102 that encodes programs 104 contained within signals 111 into one or more adaptive streams 105A-C each representing a media program 104 in its entirety, but with different bit rates, frame rates, resolution and/or other levels of quality. Typically, each stream 105A-C is made up of smaller segments 106 that each represent a small portion of the program content with a single data file. Each stream 105A-C is typically encoded so that segments 106 of the different streams 105A-C are interchangeable with each other, often using a common timing index. This allows a client media player to mix and match segments 106 from different streams 105A-C to create a media stream that effectively adapts as network conditions or other conditions change.

The adaptive streaming example of FIG. 1 shows sets of segments 106 making up each stream 105 being stored on a content delivery network (CDN) or other content source 107 for distribution on the Internet or another network 125 as part of an RSDVR, VOD or other media streaming service. Typically, a media player application executing on one or more playback devices 120 contains intelligent logic to select appropriate segments 106 as needed to obtain and playback the media program 104. Segments 106 may be interchangeable between streams 105 so that higher quality segments 106 are seamlessly intermixed with lower quality segments 106 to reflect changing network or other conditions in delivery over network 125. Since the segments 106 are typically stored as separate files, segment requests may take the form of conventional hypertext transport protocol (HTTP) constructs (e.g., HTTP "get" instructions) or the like. Such constructs are readily routable on network 125 and can be served by conventional CDN or other web-type servers 107, thereby providing a convenient mechanism for distributing adaptive media streams to a variety of different client devices on network 125.

Again, other embodiments may use different encoders 102 for encoding cable television signals, DBS signals, or the like; still other embodiments may omit the encoding function entirely and perform audio analysis or other content recognition separately from the distribution function. Since many distributors already receive program signals 110 for encoding, there may be an economy of scale in performing the content recognition function at the same time. Other embodiments could nevertheless use different encoding or streaming structures or techniques, as desired, or content could be equivalently aggregated and/or broadcast via satellite, cable, terrestrial broadcast, non-adaptive media stream and/or the like. As noted above, it is not necessary that the analyzed content be re-broadcast or re-distributed by the analyzing party in all embodiments. It may be sufficient for many purposes to simply gather data for recognizing advertisements or other portions of the content, for analyzing or further processing information about the recognized advertisements and/or for taking other actions as desired without necessarily re-broadcasting or redistributing the content itself.

The original broadcast content may be received by the various client devices 120 in any manner. Although FIG. 1 illustrates an adaptive encoder that creates data segments 106 for delivery over a network via CDN 107, content may be equivalently received, for example, via direct broadcast satellite (DBS), internet television (IPTV), cable distribution, terrestrial broadcast or another source 161. The ad data in database 150 may be shared with the client devices 120 separately (e.g., in an electronic program guide or separate out-of-band transmission, or in a separate message sent over network 125 or the like). Alternately, the content provider may embed some or all of the needed data 150 in an MPEG multiplex or other portion of the broadcast signal itself, as desired.

Various embodiments may realize substantial benefits by integrating the identification information obtained from content recognition into content management data. As noted above, content recognition may be performed in real time (or near real time, accounting for inherent delays in data processing, communications and the like) as the program streams are received, thereby allowing for very rapid identification of then-current broadcast content. This information may be readily incorporated into electronic program guide (EPG) data or other content management data that is provided to the television receiver or other playback device.

Content management system 130 shown in FIG. 1 is a computer system that has any conventional processor 131, memory 132 and input/output interface 133 features commonly associated with data processing systems, including any sort of cloud-based resources. Many content aggregators currently use content management systems 130 to manage and distribute electronic program guide (EPG) data and other information about the programs that are distributed within system 100. These systems 130 may be expanded to process information relating to advertisements or other portions of the content stream, to associate actions to be performed by the viewer and/or the playback device based upon the content of the stream, and/or for any other purpose.

FIG. 1 shows an example of data 150 that could be maintained by content management system 130. As shown in the figure, data 150 could include channel information 151 and timing information 152 about each entry so that the particular content can be readily identified. Other embodiments may use different identification data, such as distributor or network information, or any other information as desired. Although some implementations may incorporate conventional EPG data (e.g., data obtained from a vendor or other source), the example of FIG. 1 uses channel and time so that even portions of a program can be individually identified. Advertisements, for example, could be referenced by their channel and broadcast time so that additional actions unique to those advertisements could be enabled. Other embodiments could use different timing references (e.g., references to MPEG presentation time stamps (PTS) in the underlying content, references to event anchors in the content itself, and/or any other timing references) as desired.

Data 150 as illustrated in FIG. 1 also includes description information 153 and/or action information 154. The description information 153 may simply describe the contents of an identified portion (e.g., "ad", "shoe ad", "Nike ad", "action scene", "Battle for Helm's Deep", etc.) using text or any code. Since the information was obtained from the actual live broadcast itself, it will typically be very accurate in both timing and content, even if programming is delayed or otherwise modified from a predetermined schedule for any reason, and could be used to provide very accurate indexing through the broadcast, for example. Data 150 may also include action information 154 to separately trigger an action by the playback device, as described more fully below. A playback device could, for example, be programmed to offer a web link to an online shoe retailer whenever a "shoe ad" is run, or to offer additional content, or to take any other action. Data 150 as shown in FIG. 1 is merely an example; other embodiments may be differently organized or encoded, and/or may represent description information 154 and action information 155 in any other manner.

Data 150 may be provided to any sort of media player, television receiver, network server or other recipient device in any manner for storage and further processing as desired. In various embodiments, data 150 including information obtained from the content analysis is provided as part of EPG information delivered to set top boxes or other television receivers associated with cable, DBS or other distributors 126. Such information may be delivered using a batch delivery, when possible, or in real time (accounting for some delay inherent in data processing and transmission) as desired. Some of all of data 150 may also be provided to media players, television receivers and/or other playback devices 120 via a network service such as content source 107 or a separate network server 122, as desired. Server 122 may be useful in, for example, providing the content information to a smart phone, tablet or other computer, video game player, remote control device or other "second screen" 127 that may be used by the viewer while he or she is also watching broadcast television. In various embodiments, data 150 could include action data 154 that triggers games, applications, web links or other features accessible using the second screen that are time coordinated to the advertisements or other programming that is currently viewed on a television or other display. Data 150 could be formatted in any manner. In various embodiments, data 150 could include action data 154 and/or identification data as tags or the like in an XML-type format. Again, many other embodiments could incorporate any number of additional or alternate features to take advantage of the real-time identification feature provided by the broadcaster.

As noted above, real-time recognition of broadcast ads enables any number of new actions that could be taken based upon the identified content. In some embodiments, the identification information is simply collected in database 145 for tracking and further analysis. Other embodiments could additionally or alternately tag the content itself, as desired. In various embodiments, updating of advertisements can occur initially determining whether a recognized ad is potentially replaceable, and if so, performing additional processing to begin tracking actual viewing in database 165, and to tag the ad so that playback devices 120 can perform tracking and/or replacement as described herein. In various embodiments, tracked ads are tagged with metadata to prompt additional actions by the playback devices 120. The additional actions may include updating database 165 as the tagged ad is actually viewed, replacing the tagged ad as instructed by further logic in data 157 or the like, and/or taking other actions as desired.

The identification information 150 may be forwarded to content management system 130, servers 107 or 122, playback devices 120 and/or any other destinations as desired. Data 150 may be delivered via a cable or DBS broadcast system, for example, as batch or real-time out-of-band content similar to EPG data. Alternately, data 150 may be stored with the content itself, as in an RSDVR or VOD system, or in an MPEG structure, and/or the like. Content and data 150 may be otherwise transmitted to a playback device 120 and/or second screen 127 via network 125 or in any other manner.

Various embodiments also include a database 165 for tracking viewing of identified advertisements. Database 165 may be physically and/or logically combined with ad database 145 in some implementations. Alternatively, viewership database 155 may be physically and/or logically separated from database 145 in any manner; database 165 could be maintained on separate computing hardware, for example, using separate database management software as desired. Although FIG. 1 shows database 165 being implemented as part of content management system 130, equivalent embodiments could implement database 155 as part of content source 107, server 122 and/or any other service, as desired.

Viewing database 165 suitably maintains additional data 155-157 to track actual viewing of identified advertisements. In the example of FIG. 1, data 155-157 is shown in a combined data structure with data 150 for convenience, although the different fields in data 150 may physically and logically reside in separate locations within databases 145, 165 and/or other databases, as desired.

In the example of FIG. 1, each playback device 120 updates database 155 as appropriate to track actual playback of certain advertisements (or other program segments). To that end, data field 155 indicates whether a viewer has actually watched a recognized ad. This indication may be, for example, a binary flag indicating whether an ad has been viewed by a viewer (e.g., an identified user) or playback device 120 (e.g., an identified playback device 120), a count of the number of times that the ad has been viewed, or the like. Data field 156 indicates a replacement ad, if desired, and data filed 157 includes any additional data, such as metadata or other rules indicating whether an ad should be replaced, and/or how the ad replacement should occur. The various rules 157 can be processed by content management system 130, by playback device 120, by content source 107 and/or by any other relevant device to replace a previously-viewed ad (as indicated in data 154) with a different ad indicated within data 156. Again, data 155, 156, 157 may be stored and processed by different devices within system 100, as desired.

Figure 2:
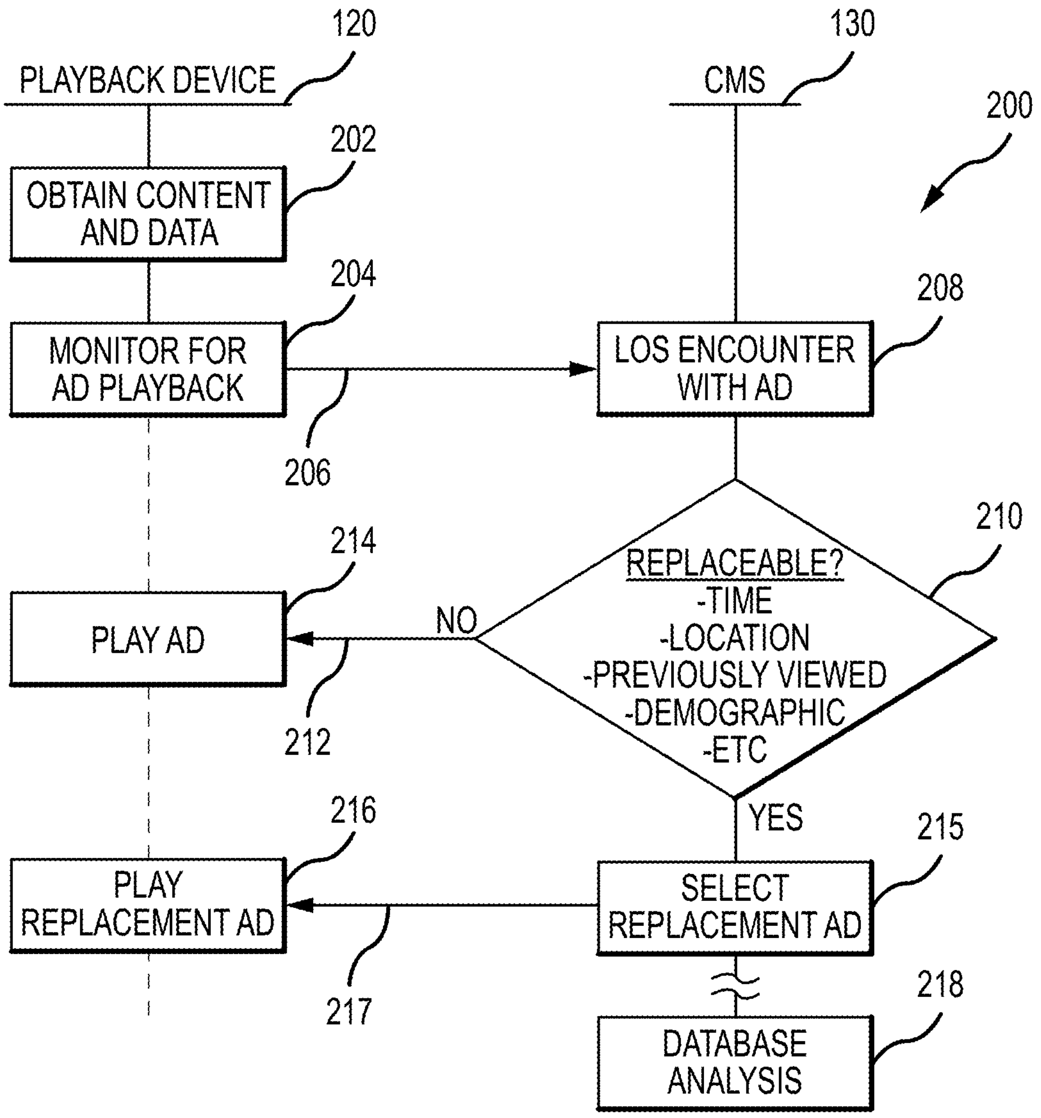
FIG. 2 illustrates an example of an automated process to replace an advertisement in a previously-broadcast program.

FIG. 2 shows an example process 200 to automatically replace an advertisement in a previously-broadcast program that is digitally stored on a DVR, that is streamed via a video on demand (VOD) service and/or the like. With reference now to FIG. 2, process 200 suitably involves the media playback device 120 selecting and obtaining the previously-broadcast video content (function 202). Content may be obtained from a CDN 107, local or remote storage DVR, VOD server on network 125 or any other source as appropriate. Playback device 120 also receives information from database 150 to identify advertisements in the program. As noted above, such information may be provided in band with the digital program content itself, or out-of-band in any manner.

Typically, the ad data from database 150 will include timing information that allows the playback device 120 to recognize those points during playback that are relevant. Timing information may be made with reference to an MPEG presentation time stamp (PTS), clock time from the start of the program, with reference to anchor points or other references within the program content itself, or in any other manner. In various embodiments, the timing information is related to timing information of the program itself rather than the actual broadcast clock time to thereby permit ad recognition even when playback is shifted in time or space, as desired.

When the playback device 120 encounters an ad that is present in database 150 (function 204), the device notifies the content management system 130 (function 206) via an electronic message 206 transmitted across network 125, or in any other manner. The encounter may refer to the ad being played back from a live broadcast, media stream, local or remote storage DVR, or from any other source. Typically, message 206 will include an identifier of the device 120 or an associated user to permit logging by the CMS 130. If the program is being obtained via a real-time stream (e.g., from a VOD or RSDVR system), then the message 206 could be implemented within a segment request placed to CDN 107 or the like. That is, it may not be necessary for the playback device 120 to perform a separate check and notification of identified ads in certain embodiments. If the potentially-replaceable ad is already stored (e.g., in a local storage DVR), however, then segment requests may not be available to track. Previously-stored content can, however, still be replaced using the processes and systems described herein.

The content management system 130 responsively records the ad encounter in the viewing database 165 to track the viewer's encounter with the ad (function 208). The CMS 130 also determines whether the original ad should be retained, or if the ad should be replaced with a new ad (function 210). If the original ad is to be retained (function 212), the playback device is notified, and playback of the previously-broadcast ad continues normally (function 214).

Ads can be replaced with other ads based upon any number of different criteria (function 215). In various embodiments, the ad is replaced based upon the time or place where playback occurs. If the ad relates to an event that has already occurred in the past and/or that is relevant only to a different geographic area from the location of playback, for example, then a more relevant ad can be provided instead. Various embodiments could additionally or alternatively compare the ad information to demographic information about the subscribed user to determine whether the ad is relevant or appropriate. Still further embodiments could replace ads based upon parental controls, user preferences, demographic information (e.g., gender, socioeconomic status, etc.), product type and/or category, and/or any other factors desired.

In still further embodiments, the ad is replaced only if the viewer has already viewed the ad one or more times. CMS 130 suitably logs each encounter with the ad in database 165, as noted above. If the viewer is determined to have already encountered the ad more than a threshold number of times, then another ad can be provided as a replacement. In some embodiments, the other ad may be an ad that is saturated for a second player device and/or corresponding user, and the ad and other ad may be swapped so that they can each be viewed on a device and/or for a user where the respective ads are not saturated. This can greatly reduce viewer boredom while providing more effective reach to the advertiser. Ad waste is also reduced, since saturated viewers will no longer see the same ad, if desired. Conversely, if a viewer has seen an ad fewer than a threshold number of times, the ad can be presented to the viewer for additional viewings, if desired. The viewing frequency of one or more advertisements can therefore be corrected on a per-viewer basis as desired.

Similarly, ads can be selected so that the viewer watches an ad campaign in a particular sequence, if desired. That is, regardless of the programs that the viewer watches, the viewer will always see the first ad of the campaign before subsequent ads. The second ad can be presented only after the first ad has been encountered, but before subsequent ads are encountered. Viewing sequence of the ad campaign can therefore be structured for maximum effect and enjoyment by the viewer, regardless of the underlying content that the viewer is actually watching.

Further embodiments could incorporate automated analysis that predicts the ads that the viewer is likely to encounter in the near future, and provide other ads that are different, or that lay foundation for the subsequently-viewed ads. If a viewer is binge watching a particular program series, for example, earlier commercials can be structured so that subsequent commercials are more effective, or at least not repetitive. Similarly, if the viewer is known to watch certain live programs (e.g., sporting events) at certain times, then ads known to run during those live events can be avoided before those times, or other ads that set up subsequent ads can be prioritized. Any other actions to improve the ad viewing experience and/or advertisement reach could be taken across a wide array of alternate embodiments. Analysis could be performed by software or other programmed logic executed by content management system 140, or by any other data processing system as desired. Instructions to select ads that are delivered may be executed by content management system 140.

The playback device 120 receives and plays back the replacement ad as appropriate (function 216). In various embodiments, CMS 130 provides a notification message 217 that includes reference to digital content available from a network content source 107 or the like. In still other embodiments, replacement ads can be transferred to the playback device 120 on an a priori basis, before they are needed for playback. Satellite or network transmissions, for example, could provide any number of possible ads for playback to one or more playback devices 120. Each device 130 could then store the ads in a hard drive or other non-transitory storage for subsequent playback when indicated by the CMS 130. A bundle of possible ads could be pushed out at times of low bandwidth (e.g., overnight), and various embodiments could send the ad bundle as an efficient broadcast (e.g., via simultaneous satellite broadcast to a large number of satellite receivers) for storage and subsequent use, as appropriate. Replacement ads could be sent as batches (e.g., via a satellite or network broadcast), or specific ads could be pushed to particular viewers as desired. The replacement bundle could be customized to the viewer or the playback device 120, if desired, or a common bundle of ads could be broadcast to multiple viewers/devices in other embodiments. In the latter example, particular replacement ads may be selected and extracted from the bundle for the particular viewer, as desired. This would allow satellite or other broadcast distribution of a common ad bundle, if desired, while retaining the benefits of individualized ad replacement. Ads may not need to be delivered in real time, then, to permit real time ad replacement during playback of previously-stored content, although some embodiments may alternately or additionally provide real time (or near real time) ad delivery, if desired.

The information collected in viewership database 165 may be analyzed by CMS 130 or by another processing system as desired (function 218). The collected information will include accurate ad viewing data for any number of different viewers/devices, regardless of the channel or time that the ad was originally broadcast. This level of viewership data may be particularly useful in gauging the effectiveness of ad campaigns, tracking the results of certain ad buys (e.g., identifying the actual viewership of an ad even across time and place shifted playback), and the like. Some implementations may use the actual viewership data to make further improvements in ad campaigns, e.g., by suggesting that advertisers place ads in certain programs frequented by otherwise unreached viewers, or by changing the frequency that certain ads are broadcast. Many other embodiments could be formulated to use viewership data in any number of different ways.

Figure 3:
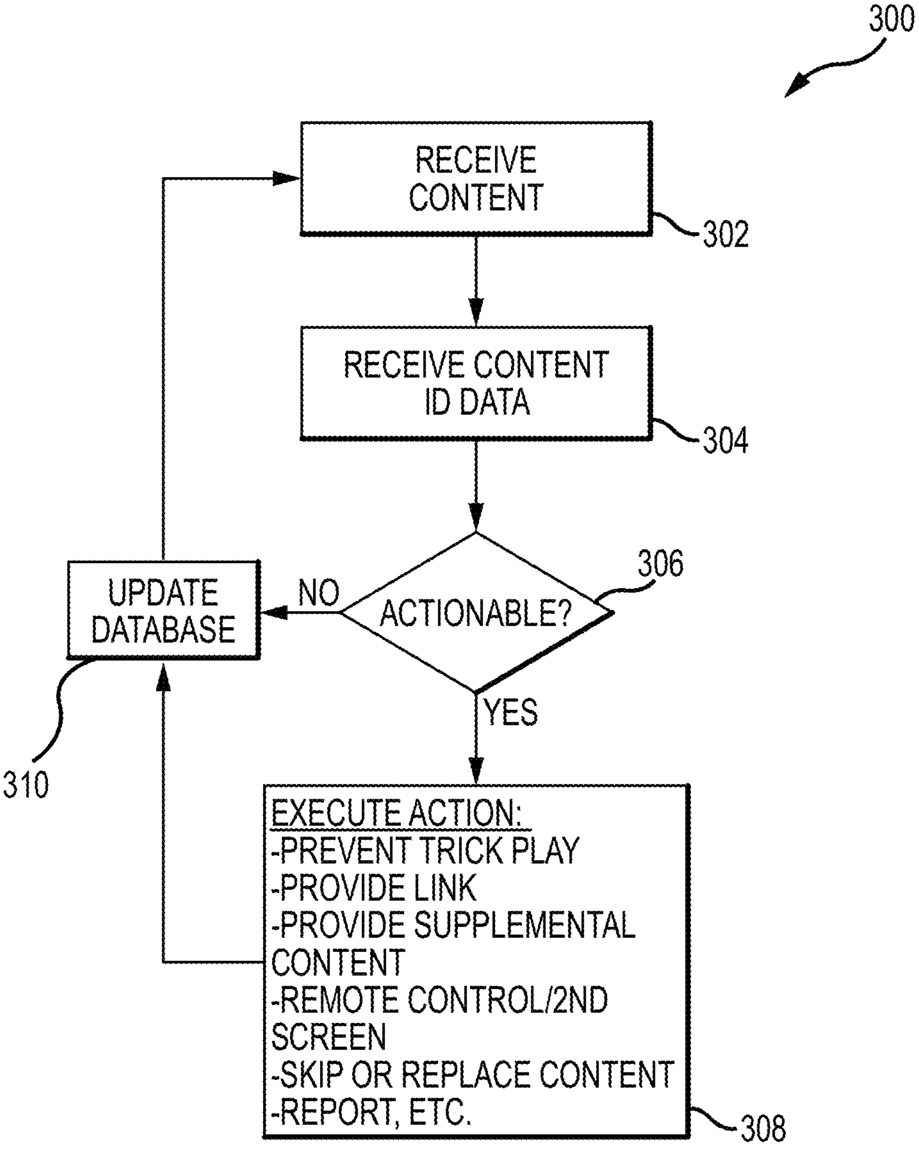
FIG. 3 is a flowchart of an example automated process executable by a client device to process actionable content in a broadcast television stream.

FIG. 3 shows additional detail about an example process executable by a media player, television receiver or other playback device 122 to track and replace identified content in a television broadcast.

The playback device 120 initially receives the television broadcast stream or other content (function 302) from a terrestrial or satellite broadcast, a cable television connection, or any other source. The playback device 120 also receives some or all of the information 150 identifying advertisements or other portions of the broadcast (function 304). As noted above, the information 150 may be provided with the broadcast content (e.g., as associated EPG data, as part of an MPEG or similar media package, and/or otherwise via the same cable, DBS, terrestrial broadcast or other source). Information 150 may be equivalently obtained separately from the content (e.g., from a server 107 or server 122 on network 125) if desired.

The receiving device 120 monitors data 150, as appropriate, to identify any actionable events that may occur during the viewer's programming (function 306), such as any ads that are being tracked. If an actionable item is identified on a channel and time that is being actually by the viewer, then the playback device suitably executes the requested action (function 308). The action may be, for example, transmitting a message via network 125 to the content management system 140 to update database 165, and/or to take any additional actions as desired. Further actions may include performing an ad replacement, ad swapping (a type of ad replacement) for example as described herein with respect to FIG. 6, or similar ad modification as desired.

Several examples of other actions 308 that could be executed are described herein, and many others could be formulated across a wide array of alternate embodiments. Function 308 could represent any number of different actions performed by different types of devices 120, as desired. These examples presented herein are not intended to be limiting.

In various embodiments, the data 150 identifies any commercials in the broadcast stream that can be replaced. Ads can be recognized by identifiers, as described herein, or by their broadcast times within the program. That is, if the precise times of the commercials in a broadcast stream were identified using data 150, then playback device could use this timing information 152 to skip over the commercials, or to replace the commercials with other content as desired. Such replacement could be used, for example, to replace an ad that is of low interest to the viewer (e.g., an ad that has been previously viewed) with an ad that is of higher interest based upon demographic information or customer profile data available to the playback device 120. Ads that are time or location sensitive could also be replaced with different ads that are more relevant to the then-current viewing conditions, as described more fully below.

Note that supplemental content (including audio/video content or the like), replacement ads, or other data 150 associated with identified content may be stored along with recorded programs in a DVR or other storage of receiver 120 so that any supplemental effects, replacements, or the like could still be performed even during time-shifted playback. If the supplemental content relates to a web address or other content that is displayed on the primary or second screen, for example, the supplemental content could still be triggered even when the content is time shifted to a later playback time. Similarly, the supplemental content could be place-shifted with a video stream to another playback device 127 for viewing at a different location. Supplemental content may be otherwise transferred for viewing along with the primary content as desired. Ad tracking and replacement can also be performed for time and/or place shifted viewing, as desired. Pre-caching of possible replacement ads at the playback device 120 prior to the ad replacement can minimize latency. In some embodiments, a player device 120, content source 107, or the like may commercialize (e.g., charge a premium for) pre-caching of replacement ads, for example offering preferential replacement from the pre-cached replacement ads in the case that a replacement ad is needed.

In still other embodiments, the playback device 120, 127 could supplement identified content with links and/or additional content. Since an advertisement or the like is identified using content from the ad itself, the supplemental content could be readily linked to all of the ads belonging to a product class or relating to a particular advertiser, regardless of the time, network or channel that broadcasts the ad. This would allow, for example, an advertiser to supplement all of the ads for some or all of their products with additional features on the playback device 120 regardless of the content of the ad, the broadcast network, or the time of broadcast. If an advertiser wanted to display a logo on a second screen and/or provide a link to its webpage while any of its ads were played, for example, data 150 could instruct such actions for any ads that are associated with that advertiser. The playback device 120 (or second screen 127) would then interpret the data 150 whenever an ad for that advertiser was presented, and would respond appropriately to take the instructed action. A link to a retail site could be provided during an ad, for example, so the viewer could simply click on a button or execute a similar feature to purchase the advertised product. Additional content (e.g., a longer ad, a movie, a game or the like) could also be provided so if the viewer wanted more information about the advertised product, he or she would be able to obtain it immediately and conveniently. Further, since data 150 is associated with the programming itself, the requested action could be performed whenever and wherever the content is played for the viewer, even if the content is place or time shifted.

As noted above, additional content could additionally or alternately be provided via a secondary device 127, as desired. The secondary device 127 may receive information 150 in addition to or in place of the playback device, as desired for the particular application. Any other content could be provided in addition or in alternative to that described here, and such content could be provided in any manner. This could provide a significant benefit to advertisers, who may want to supplement their broadcast ads with additional content and/or to target their additional content toward certain viewers.

Further, advertising or other content can be replaced, as desired. In a similar manner as discussed above, if a viewer has already viewed an advertisement more than a threshold number of times, for example, then the player device 120 may request a replacement ad for the same timeslot. In other embodiments, certain ads recorded as part of the original broadcast may no longer be relevant if the program has been recorded and has not yet played back for some time. Ads for soon-to-be-broadcast television programming, for example, may be irrelevant after the advertised program has already been broadcast. Player device 120 may be able to request a replacement ad so that outdated ads in stored (e.g., time shifted) programs are replaced with more current advertisements (e.g., ads for programs that still have not been broadcast, or for different products, services or programming altogether).

In another example, local ads could be replaced when the viewer has placeshifted viewing to a different location where the local ad is no longer relevant. If a viewer located in Colorado is viewing a placeshifted stream of a Utah broadcast, for example, various embodiments would allow the playback device 120 (and/or second screen device 127) to recognize Utah-centric ads in the placeshifted stream, and to replace the Utah ad with a more appropriate local ad (or a national ad) for the viewer's current locale. Other embodiments could replace ads in live broadcasts, delayed broadcasts, or in programming that has been shifted in place or time in any manner.

Processing of logic in data 157 to perform ad replacement can occur at any place and time, as desired. Various embodiments provide data 155-157 directly to playback devices 120 to allow local processing of ad replacement. Although many implementations will also update a remotely-located database 165 to permit centralized analysis of ad viewing (function 310), this is not required. Other embodiments may perform the ad replacement process using content source 107, and/or content management system 130, as described below. To that end, ad replacement logic 157 may be executed by any processing hardware within system 100 to identify a previously-viewed ad (data 155) and replace it with a different ad (data 156), as desired.

Replacement content may be obtained by, for example, the player device 120 processing URLs or other identifiers associated with the identified ads. Such identifiers may be delivered with the supplemental content as described herein, and may be processed by the playback device (e.g., device 120 and/or second screen 127) to obtain supplemental content or further instructions from the content management system 130 or another content source 107, as desired. The playback device 120 and/or second screen device 127 is then able to receive data and/or instructions from the content management system 130 to replace ads, or to take other actions as described herein.

Figure 4:
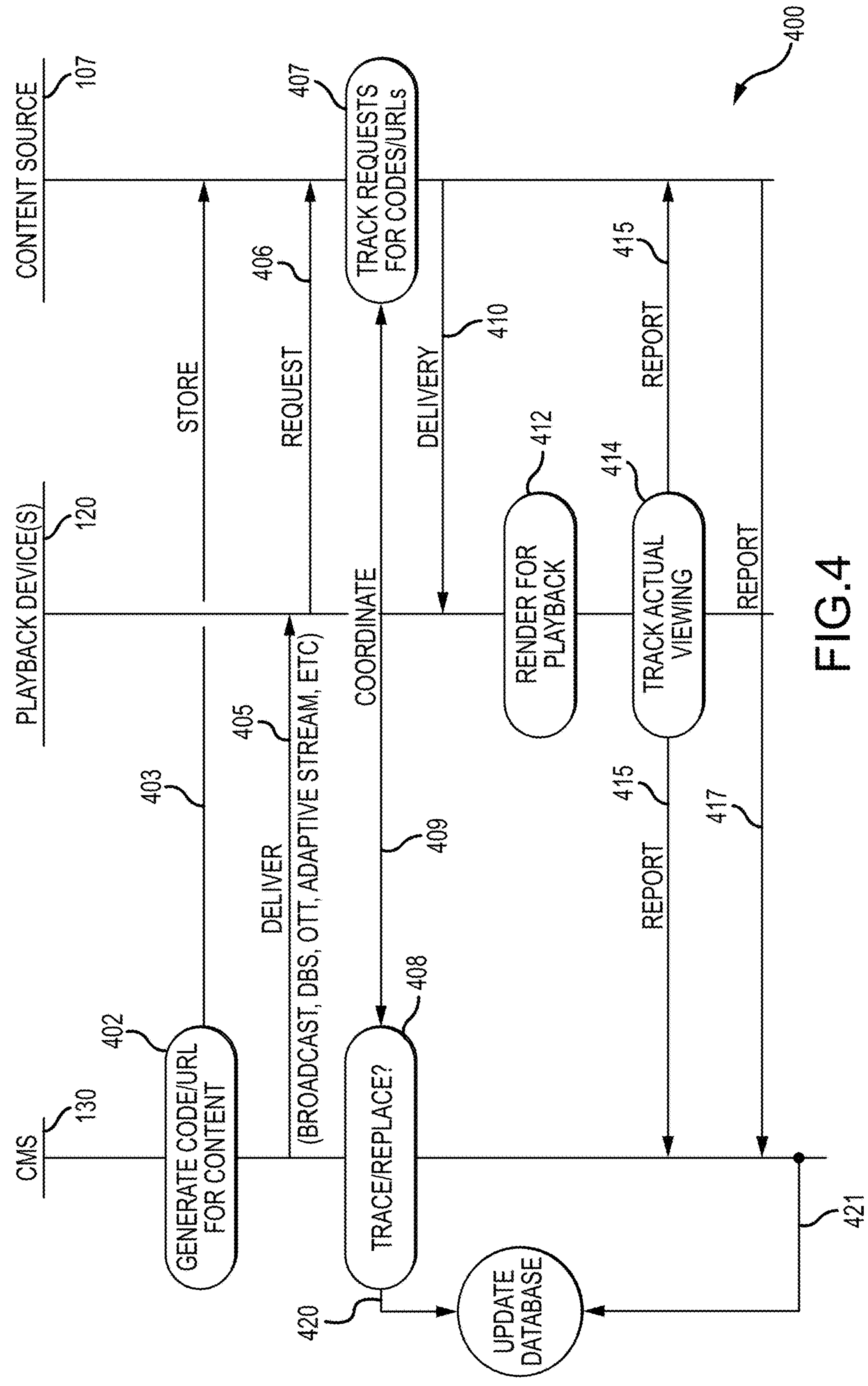
FIG. 4 shows an example of an automated process to deliver, monitor and update advertisements.

With reference now to FIG. 4, an automated process 400 for delivering, replacing and/or tracking ads (or other content) is shown. In the example of FIG. 4, a content management system 130 or other data processing system generates identifiers (function 402) for ads that are delivered to viewers via a CDN or other content source 107, as described above. These identifiers 402 may be initially stored in database 150 or the like. Identifiers 402 may be any sort of digital identifiers, including any sort of unique alphanumeric or other codes that uniquely identify the various ads available for tracking within the system.

In various embodiments, the identifiers are uniform resource locators (URLs) that uniquely identify the ad to a CDN, or to any other content source 107. In such embodiments, identifiers 402 are shared between content source 107 and content management system 130 (function 403) as desired. The identifiers/URLs are then distributed to media players, television receivers and/or other network-enabled playback devices 120 as described herein (function 405). Identifiers may be distributed with EPG data provided as part of a cable, satellite or terrestrial broadcast, for example. Other embodiments could distribute identifiers as part of a digest or other metadata accompanying an adaptive or other media stream, such as an over-the-top television stream, a placeshifted media stream, a stream from an RSDVR or VOD service, and/or the like, as described above. Still other embodiments could deliver the identifiers using a separate server on the Internet or a similar network, or in any other manner.

The media client, television receiver or other playback device 120 uses one or more identifiers to request advertisements from the content source 107. As noted above, various embodiments could use URL type identifiers to request advertisement data using conventional HTTP constructs, or the like. Note that content source 107 need not be the same source for the underlying programming. The program stream may be received via DBS or cable, for example, or from a separate service 107 on 125, even though ads are served though source 107.

Requests 406 for supplemental information could occur on any temporal basis. For example, the requests 406 could be triggered at the time that the identified media content is played back, even if the content has been time and/or place shifted. Other embodiments could trigger requests 406 as the content is received or stored, thereby allowing for caching of supplemental content for offline viewing or other purposes as appropriate. Still other embodiments can perform ad replacement for programs that are stored on a local or remote-storage DVR, as desired. That is, programs stored on a DVR may be analyzed at any time (e.g., at night, or whenever processing resources are available) and any replaceable ads in the stored content can be recognized and/or replaced. If a program stored on a DVR contains an ad for an event (e.g., a broadcast of another program) that is upcoming when the program was stored but that has since passed by, for example, that outdated ad can be replaced with something more relevant. Again, ad replacement could be performed locally by the DVR or other receiver device, or remotely, or by some combination of local and remote processing. Ads may be replaced in the stored program, if desired, and/or the stored copy of the replaceable ad may simply be tagged so that a new ad can be obtained prior to or during playback of the stored program.

As shown in FIG. 4, content source 107 receives the requests 406 received for particular ads (function 407), and responds accordingly. In various embodiments, the requests 406 identify the viewer and/or playback device 120, as well as the ad that is about to be presented. Content source 107 may simply respond with the requested ad. In further embodiments, content source 107 communicates (function 409) with content management system 130 (or another appropriate service) via network 125 or the like to update viewership database 165. To that end, the request 406 received from the playback device 120 serves as an indication that the tagged ad is being viewed, or is about to be viewed.

Content management system 130 responds to the communications 409 from the content source 107 as appropriate (function 408). In various embodiments, content management system 130 simply updates viewership database 165, as appropriate (function 420) to track the number of times that the particular viewer (or at least the particular playback device 120) has viewed/encountered the identified ad. The content management system 130 may similarly track (e.g., by updating viewership database 165, ad database 145, etc.) the number of times that the particular viewer and/or playback device 120 has viewed/encountered ads by a particular advertiser, in a defined genre, and/or other demographical category of a plurality of ads.

Further embodiments of function 408 may implement logic 157 or the like to further determine whether to replace the ad provided to the viewer. If the viewer has previously watched the ad more than a threshold number of times, for example, it may be desirable to provide a different ad. Similarly, if the ad is no longer relevant (due to the time elapsed since broadcast, or a placeshifted location of playback, and/or any other factors), a more relevant ad can be presented in place of the broadcast ad. If a replacement ad is preferred, then content management system 130 suitably provides a return instruction via communications 409 to content source 109 that directs content source 109 to serve a different ad. The replacement ad may be indicated in metadata (e.g., data 156 or the like) or elsewhere as appropriate. Equivalent embodiments could perform functions 408 and 420 by the content source 109, if desired.

In various embodiments, requests 406 may be additionally or alternately tracked in conjunction with time data, client ID data, location data or the like. This allows content source 107 or another data processing system to monitor demand for a particular ad, and/or for any other purpose. Such demand may be tracked over time to identify times of high or low demand, to identify times and frequencies of place or time shifting, to identify playback locations for more appropriate local ads, to identify types of clients/users who are placing requests for the ad, and/or for any other purpose. To that end, even if identifiers 402 are URLs that can be processed to contact server 107 during playback of identified content, it is not necessary that the identifiers 402 request a particular ad, or ad content at all. It may be beneficial to simply track the times (and source locations) of requests 406 that are posited by various playback devices 120 and 127, since these requests are highly indicative of time and place of playback.

Content source 107 delivers advertisements to the playback devices 120 (function 410). The ads that are delivered may correspond to the original ads requested and/or any replacement ads, as desired. As noted above, content source 107 processes the URLs, tags or other identifying information contained in requests 406 to provide advertisements as described herein. Advertisements may be delivered in file formats, streaming formats (e.g., adaptive streaming formats) and/or otherwise, as desired.

Additional information could be determined through reverse geolocation of the requesting client's IP address or the like to determine rough geographic location of the requesting client, thereby allowing the system to track which ads are more or less popular in certain geographic regions. Other information may be logged, tracked and/or otherwise processed, as desired. The CDN/content source 107 is therefore able to track requests for particular ads that are delivered to the different media clients (function 410) for playback by the media client (function 412). Playback 412 may take place via a locally-attached television, monitor or similar display, although equivalent embodiments could place shift an encoded media stream to a mobile phone, tablet or other remotely-located device (e.g., device 127 or the like).

Time and/or place data associated with requests 406 may be recorded by content source 107 or the like for any purpose. In various embodiments, it may be helpful to track the times that identified scenes are actually played back by the various devices 120/127, since this information is very helpful in allowing broadcasters and advertisers to track the amount of timeshifting and/or place shifting that is occurring. Network requests 406 may also be indicative of the number of viewers who are actually watching the ad, as opposed to the number of viewers who simply record the program (without watching it), or who skip over the ads during playback. This information may be reported back to the content source 107, management system 130, to a separate server 122 on network 125, and/or to any other recipient as desired (function 417) to update viewership database 165 (function 421).

Further embodiments could additionally or alternately track the actual viewing of ads by the media client, receiver or other playback device 120. In such embodiments, the playback device 120 tracks and reports back to database 165 or another database hosted by media source 107, content management system 130 and/or any other network service 122 to indicate which ads were rendered to the viewer (function 414). Ads may be identified by the identifiers described above, or using any other information. In various embodiments, identifiers for the ads are delivered in band or out of band with the content, so the player device 120 simply tracks the identifiers of those ads that have been rendered to the viewer. Ad tracking may be reported back to a data collection system in any manner (function 415); batches of reports may be sent on any regular or irregular temporal basis, or data may be polled by the server, for example. This information can be used to update viewership database 165 (function 421). Ad tracking data (ad identifications, playback times, etc.) may be equivalently reported to content source 107, or to any other server 122 operating on network 125. Note that various embodiments are able to report and track actual viewing (or at least presentation) of the particular ad. That is, if a viewer fast forwards over an ad without watching it, then a "view" may not be indicated. Conversely, if a user watches a program more than once, it is possible to supply different ads for the second (and subsequent) viewing rather than repeating the same ads. Moreover, variation in ads may encourage viewers to watch the ads rather than skipping over them, thereby making all of the ads more effective in reaching the intended targets.

The information contained within requests 406 may be stored and analyzed in any manner. In various embodiments, content source 107 tracks requests 406 received from multiple media players 120, 127 to quantify the number of times that the identified advertisement is viewed. As noted above, time or location data associated with requests 406 may also be tracked in database 165 or elsewhere to monitor time or place shifting by the various users. This information may be tracked over time for any number of different users, programs and advertisements to gather a wealth of useful information. Processing of request data 406 may be equivalently performed by content management system 130, by server 127, and/or by any other processing device or system as desired.

Figure 5:
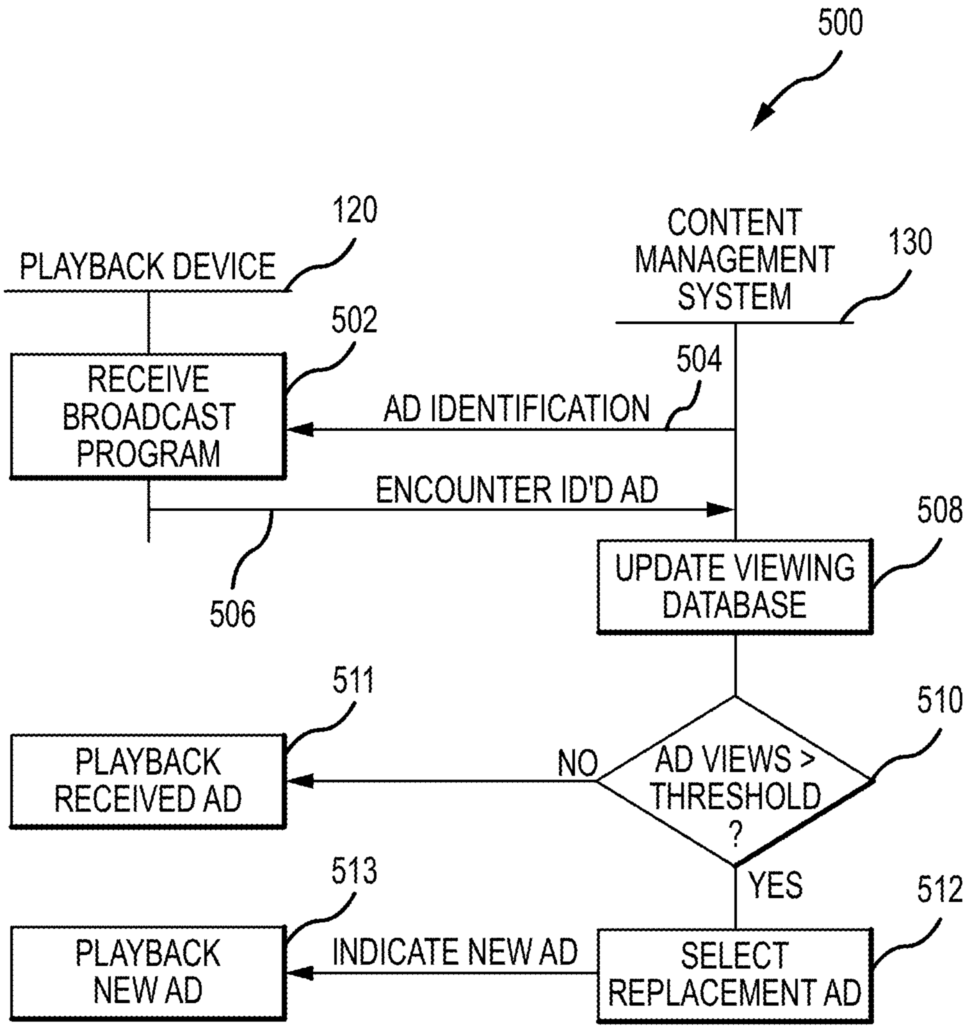
FIG. 5 shows an example of an automated process to correct digital advertisements in previously-delivered television programming.

FIG. 5 illustrates one example of an automated process 500 that can be used to replace ads in broadcast programs that have been previously experienced by the viewer to prevent boredom or annoyance, and to prevent oversaturation of ads that are part of a marketing campaign. As shown in FIG. 5, each playback device 120 interacts with a content management system 130 to track ad viewing and to refresh previously-viewed ads as desired. The various functions and messages shown in FIG. 5 may be supplemented or differently arranged in other embodiments, and/or the functions shown may be performed by different computing hardware, as desired.

As noted above, playback device 120 suitably receives broadcast television content (function 502) from any streaming or broadcast source (e.g., CDN 107, broadcaster 161 and/or the like). Playback device 120 also receives information 150 about the received programs from content management system 130 (function 504), or from an equivalent source. As noted above, information 150 may be received as part of an electronic program guide, as part of an MPEG multiplex or other data bundle that includes the program content itself, from a different service on network 125, and/or from any other source.

As the playback device 120 encounters an identified advertisement, the device 120 suitably notifies the CMS 130 (function 506) that an identified advertisement has been encountered. As noted above, the encounter may occur even though the content is time shifted, place shifted, and/or otherwise modified in any manner. The encounter may occur as a playback device 120 is processing the program prior to displaying the program (e.g., while storing the program for time and/or place shifting), may occur as the playback device 120 is playing back the program, may by triggered by a marker in the program indicating the upcoming ads, or at any other suitable time in which the playback device 120 is processing or otherwise examining the program.

Upon receiving a notification of an identified advertisement from the playback device 120, CMS 130 suitably updates database 150 (function 508) to indicate that the ad has been viewed by that device and/or viewer. Data 155 (FIG. 1), for example, could track the number of views of any particular ad by that viewer or device, as desired. Various embodiments could further track the time and/or location of the viewing, if desired, based upon the time and/or any geolocation data associated with a network address of the playback device 120 that transmits the message 506.

In the example of FIG. 5, CMS 130 also uses the updated to determine whether the identified advertisement has been previously encountered by the same user and/or device 120. In some embodiments, the ad can be replaced if the same user/device 120 has encountered the same identified advertisement more than a threshold number of times (function 510). The particular threshold values used for different advertisements can be determined in any manner. Advertisers could direct that ads be replaced after a certain number of views, for example, or the number could be determined by the system operator, or by the viewer. That is, a viewer/user of device 120 may, in some embodiments, direct that ads be replaced after an appropriate number of viewings, if desired. The number could, in some embodiments, be configurable by the user, subject to reasonable constraints that may be placed by the system operator and/or advertiser, as appropriate. The number could, in some embodiments, be configurable by the CMS 130 operator, advertiser, CDN 107, or the like. Different advertisements could have different threshold values, if desired.

If the number of views does not meet and/or exceed the relevant threshold value (function 510), then the playback device simply renders the identified ad from the broadcast content as usual. If the number of views does meet and/or exceed the relevant threshold, however, then the CMS 130 selects an appropriate replacement ad (function 512) as described above. The replacement ad is identified to the playback device 120 (e.g., by a URL, and identifier of an ad previously stored on the playback device 120, and/or the like), which then obtains the replacement ad and renders the ad to the viewer as part of the playback of the broadcast television program (function 513).

In an embodiment, the playback device 120 handles ad replacement locally for some or all of the identified ads (e.g., functions 510 and 512 performed by the playback device 120). In that case, device 120 will maintain its own counters of ad views, along with appropriate thresholds for replacement. Replacement ads may be stored locally on the playback device 120, if desired, or may be available from CDN 107 or another source on network 125, as discussed above.

Figure 6:
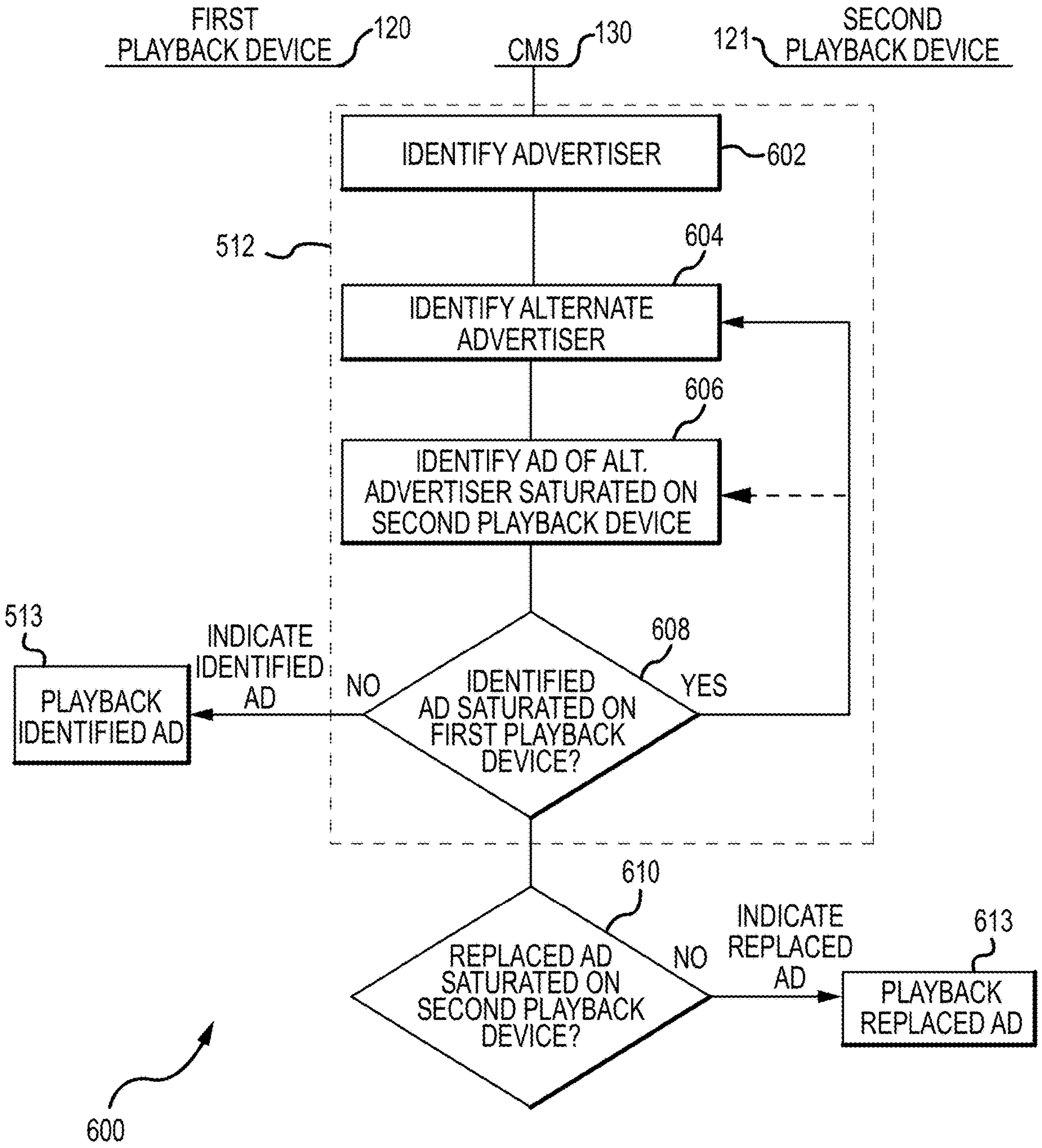
FIG. 6 shows an example of an automated process to select a replacement advertisement.

FIG. 6 illustrates an automated process 600 as an exemplary embodiment of replacing an advertisement as described with respect to the automated process 500 of FIG.

5, which can be used to replace ads that have reached saturation with a particular playback device 120 and/or corresponding user. In some embodiments, selecting an appropriate replacement ad (function 512) may comprise selecting a replacement ad that is saturated (e.g., at or above a respective threshold) on a second playback device 121 and/or for a corresponding second user of the second playback device 121. In some embodiments, both saturated ads (the ad saturated on the first playback device 120 and the ad saturated on the second playback device 121, or corresponding users) may be swapped.

After a determination is made that a first ad is saturated for a particular playback device (e.g., first playback device 120) and/or associated user (function 510), the CMS 130 may, in some embodiments, identify an advertiser associated with the first advertisement (function 602). The CMS 130 may then identify an alternate advertiser (function 604) that is different than the identified advertiser, and may identify an ad of the alternate advertiser that is saturated on a second playback device 121 and/or for a corresponding user (function 606). The CMS 130 may select the alternate advertiser and identified ad based on any suitable criteria, for example selecting an advertiser and/or ad that is in the same category as the ad to be replaced, pertains to the same demographic as the ad to be replaced, or the like.

The CMS 130 may determine whether the identified ad of the alternate advertiser is saturated on the first player device 120 and/or for a corresponding first user (function 608), and if not may then indicate the new ad to the first playback device thereby directing it to obtain and play the identified ad (function 513, as described with respect to FIG. 5). If the CMS 130 instead determines that the identified ad is also saturated on the first playback device 120 and/or for a corresponding user, then the CMS 130 may continue to search for a suitable replacement ad by repeating functions 604 and/or 606, as desired. Functions 602, 604, 606, and 608 may collectively implement all or part of the function of selecting a replacement ad (function 512) as described with respect to FIG. 5.

In some embodiments, the CMS 130 may further determine whether the first ad (which was replaced by the identified ad) is saturated on the second playback device 121 and/or for a corresponding user (function 610). If the first ad is not saturated on the second playback device 121 and/or for the corresponding user, then the CMS may indicate the first ad to the second playback device 121 to thereby direct it to obtain and play the first ad instead of the identified ad (function 613). In some embodiments, functions 608 and 610 are performed together, and the change of ad indicated to the playback devices 120, 121 only when a set of ads capable of being exchanged are found.

As described above, the CMS 130 may indicate the respective ads to each playback device 120, 121 by transmitting an identifier corresponding to the respective ad. In some embodiments, function 610 and indicating the replacement ad to the second playback device 121 may be done concurrently with indicating the identified ad to the first playback device 120. In some embodiments, function 610 and indicating the replacement ad to the second playback device 121 may occur upon receiving an identifier from the second playback device indicating that the second playback device 121 has encountered the identified ad. The CMS 130 may preferentially reciprocally exchange saturated ads between two playback devices and/or users, but in some embodiments may swap among many playback devices and/or users without requiring reciprocity between any two devices and/or users.

In some embodiments, the determinations of saturation (e.g., functions 510, 608, 610) may instead determine saturation based on a plurality of different ads for an advertiser rather than based on whether a particular ad is saturated. For example, the determinations may be based on whether an advertiser has become saturated on a particular player device 120, 121 and/or for a corresponding user.

Repeated ads can therefore be identified and replaced, thereby improving the user experience while also improving ad effectiveness. Annoyingly repetitive ads can be identified and then automatically digitally replaced within the playback stream to avoid oversaturation and to reduce viewer fatigue for certain ads. Further, advertisers can exchange multiple pre-bought ad slots that would exceed a maximum number of views for a particular user or device for another advertiser's time slot that has also exceeded a respective threshold (e.g., for another user or device), thus increasing reach and saturation of a particular ad and the advertiser when it otherwise would not have been shown. This may lead to fewer lost ad slots for the CDN 107, for example. Other benefits may also be realized using the various options and other features set forth above.

The general concepts set forth herein may realize several substantial benefits that were not previously possible. Ad purchases, for example, can be monitored and improved for greatly enhanced reach and frequency of viewed ads. Rather than continuing to present the same to a viewer who has already watched the ad one or more previous times, a fresh ad can be presented in its place. This can allow serializing of ads (e.g., story campaigns in which one ad builds upon a previous ad) while ensuring that only viewers who have seen the previous ads view the subsequent "episodes", even when the ads are viewed in a time or place shifted setting. Similarly, if a campaign includes multiple spots, viewers can be made to watch all of the spots in the campaign before watching any duplicate ads. Ads could be prioritized for immediate playback, or scheduled for playback in a desired order. Many additional features could be formulated in addition to these illustrative examples.

By tracking actual viewership of specific ads and targeting ads specifically to viewers who have not previously seen specific ads, the effectiveness of ad placement and presentation can be greatly enhanced over prior targeting techniques that relied heavily upon demographic viewership data (e.g., what types of people watch certain shows). Ads may still be targeted based upon demographic information, but based upon actual viewership by an actual viewer, rather than based upon demographic traits of average viewers for a program. That is, replacement ads may be additionally selected based upon the demographics, viewing habits or other characteristics of the specific viewer, thereby greatly enhancing the effectiveness of the ad. Further embodiments allow for more optimized pricing for advertisements, since ads can be targeted specifically to viewers who have not previously seen the ad, and without regard to the underlying content being watched. To provide just one example, ads for athletic shoes can be targeted to a viewer who is expected to be interested in sporting products even if that viewer is currently watching a movie, drama or other program that is not related to sports. Targeting ad replacement allows for much more effective advertising campaigns in comparison to simple ad buys for particular programs.

Although FIGS. 1 and 2 show a single playback device 120 for convenience, practical embodiments could scale equivalent concepts to any number of different playback devices 120. Indeed, a DBS, cable or other broadcaster/content aggregator may be able to identify content prior to broadcast so that a large number of devices receiving the broadcast are able to take enhanced actions based upon the identified content. Moreover, by tracking ad requests for a large number of player devices 120, aggregate viewing habits (e.g., place or time shifting habits) can be monitored, thereby providing valuable information. Even further, it can be very helpful for advertisers to track the broadcast as well as the viewing of their various ads across multiple markets, channels or networks. The systems, devices and processes described herein could be readily scaled to deliver identified content, to enhance the viewing of identified content, and/or to collect viewing information for any number of playback devices and systems, as desired. As noted at the outset, it can be a substantial challenge to track ad viewership across thousands (or more) of playback devices, including devices that support time and/or placeshifting. Various systems and processes described herein are able to recognize advertisements that are present within any number of broadcasts and recordings, and to track viewership of the ads even when the viewing is place or time shifted. Moreover, various embodiments are able to update stale or previously viewed ads distributed across a large number of recording devices to improve the viewing experience for a large number of viewers while adding substantial value to the advertiser.

The foregoing discussion therefore considers various systems, devices and processes for real-time identification of advertisements or other portions of television broadcasts or other media content using content analysis. By identifying advertisements or other portions of the content prior to broadcast (or other distribution), a variety of new features can be provided while retaining a high level of accuracy in identifying ads as they are actually broadcast. By capturing the identity of the ads at the initial point of ingestion, the content distributor or other data-gatherer is able to offer any number of useful new features and benefits, several examples of which are set forth herein.

The general concepts set forth herein may be adapted to any number of alternate but equivalent embodiments. The term "exemplary" is used herein to represent one example, instance or illustration that may have any number of alternates. Any implementation described herein as "exemplary" is not necessarily to be construed as preferred or advantageous over other implementations, nor is it necessarily intended as a model that must be duplicated in other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process performed by a computer system having a processor, a data storage, and an interface to a network, the automated process comprising:

providing, by the computer system via the network, to a first playback device, a plurality of identifiers describing a plurality of recognized advertisements in a plurality of media programs;

receiving, by the computer system via the network interface, a first identifier of the plurality of identifiers corresponding to a first recognized advertisement encountered by the first playback device;

determining, by the processor, a saturation of the first playback device comprising determining that the first recognized advertisement has been played by the first playback device at least a first threshold value; and replacing, by the processor and based upon the determined saturation, the first recognized advertisement on the first playback device, comprising:

identifying, by the processor, a first advertiser associated with the first recognized advertisement;

identifying, by the processor, a second advertiser different from the first advertiser;

identifying, by the processor, a second recognized advertisement associated with the identified second advertiser;

determining, by the processor, that the second recognized advertisement is saturated on a second playback device, comprising determining that the second recognized advertisement has been played by the second playback device at least a second threshold value; and transmitting, to the first playback device via the network and in response to determining that the second recognized advertisement associated with the identified second advertiser is saturated on the second playback device, a second identifier corresponding to the second recognized advertisement to thereby direct the first playback device to obtain the second recognized advertisement and to present the second recognized advertisement instead of the first recognized advertisement.

2. The automated process of claim 1 wherein:

the first recognized advertisement was contained within a first media program of the plurality of media programs;

the first media program was requested by the first playback device; and directing the first playback device comprises directing the first playback device to present the second recognized advertisement during playback of the first media program.

3. The automated process of claim 1, wherein the first threshold value is associated with a first user associated with the first playback device, and wherein determining that the first recognized advertisement has been played by the first playback device at least the first threshold value comprises determining that the first recognized advertisement has been played for the first user at least the first threshold value.

4. The automated process of claim 1, further comprising:

replacing, by the processor, the second recognized advertisement with the first recognized advertisement on the second playback device, comprising:

transmitting, to the second playback device via the network, the first identifier to thereby direct the second playback device to obtain the first recognized advertisement and to present the first recognized advertisement instead of the second recognized advertisement.

5. The automated process of claim 1, wherein the first playback device transmits the first identifier in response to recognizing an upcoming playback of the first recognized advertisement by the first playback device.

6. The automated process of claim 1, further comprising:

analyzing, by the computer system, the plurality of media programs to determine the plurality of recognized advertisements and the plurality of identifiers.

7. The automated process of claim 1, wherein the second identifier comprises a uniform resource locator.

8. The automated process of claim 2, wherein the first media program is a recording of a previously-broadcast television program.

9. The automated process of claim 8, wherein the recording of the previously-broadcast television program is stored in a digital video recorder associated with the first playback device.

10. An automated process performed by a playback device having a processor, a data storage, and an interface to a network, the automated process comprising:

receiving, by the playback device via the network, a plurality of identifiers describing a plurality of recognized advertisements;

recognizing, by the processor, a first recognized advertisement of the plurality of recognized advertisements in a received first media program, wherein a data associated with the first media program comprises a first identifier corresponding to the first recognized advertisement;

providing, by the playback device via the network, the first identifier to a content management system;

receiving, from the content management system and in response to the content management system determining that the first recognized advertisement has been played by the playback device at least a first threshold value and that a second recognized advertisement associated with a different advertiser has been played by a different playback device at least a second threshold value, a second identifier corresponding to the second recognized advertisement;

obtaining, by the playback device via the network, the second recognized advertisement according to the second identifier; and presenting the second recognized advertisement instead of the first recognized advertisement during playback of the first media program.

11. The automated process of claim 10, wherein the first threshold value is associated with a first user associated with the playback device, and wherein determining that the first recognized advertisement has been played by the playback device at least the first threshold value comprises determining that the first recognized advertisement has been played for the first user at least the first threshold value.

12. The automated process of claim 10, wherein the playback device provides the first identifier in response to recognizing an upcoming playback of the first recognized advertisement by the playback device.

13. The automated process of claim 10, wherein the second identifier comprises a uniform resource locator.

14. The automated process of claim 10, wherein the first media program is a recording of a previously-broadcast television program.

15. The automated process of claim 14, wherein the recording of the previously-broadcast television program is stored in a digital video recorder associated with the playback device.

16. A computer system having a processor, a memory, and an interface to a network, wherein the processor is configured to execute machine-readable instructions that are stored in the memory and that, when executed, carry out an automated process comprising:

providing, by the computer system via the network, to a first playback device, a plurality of identifiers describing a plurality of recognized advertisements in a plurality of media programs;

receiving, by the computer system via the network interface, a first identifier of the plurality of identifiers corresponding to a first recognized advertisement in response to the first playback device encountering the first advertisement in a first media program of the plurality of media programs;

determining, by the processor, a saturation of the first playback device comprising determining that the first recognized advertisement has been played by the first playback device at least a first threshold value; and replacing, by the processor and based upon the determined saturation, the first recognized advertisement on the first playback device, comprising:

identifying, by the processor, a first advertiser associated with the first recognized advertisement;

identifying, by the processor, a second advertiser different from the first advertiser;

identifying, by the processor, a second recognized advertisement associated with the identified second advertiser;

determining, by the processor, that the second recognized advertisement is saturated on a second playback device, comprising determining that the second recognized advertisement has been played by the second playback device at least a second threshold value; and transmitting, to the first playback device via the network and in response to determining that the second recognized advertisement associated with the identified second advertiser is saturated on the second playback device, a second identifier corresponding to the second recognized advertisement to thereby direct the first playback device to obtain the second recognized advertisement and to present the second recognized advertisement during playback of the first media program instead of the first recognized advertisement.

17. The computer system of claim 16, wherein the first threshold value is associated with a first user associated with the first playback device, and wherein determining that the first recognized advertisement has been played by the first playback device at least the first threshold value comprises determining that the first recognized advertisement has been played for the first user at least the first threshold value.

18. The computer system of claim 16, wherein the automated process further comprises:

replacing, by the processor, the second recognized advertisement with the first recognized advertisement on the second playback device, comprising:

transmitting, to the second playback device via the network, the first identifier to thereby direct the second playback device to obtain the first recognized advertisement and to present the first recognized advertisement instead of the second recognized advertisement.

19. The computer system of claim 16, wherein the automated process further comprises:

analyzing, by the computer system, the plurality of media programs to determine the plurality of recognized advertisements and the plurality of identifiers.

20. The computer system of claim 16, wherein the first media program is a recording of a previously-broadcast television program stored in a digital video recorder associated with the first playback device.

* * * * *